United States Patent [19]

Hoefer et al.

[11] Patent Number: 4,549,002

[45] Date of Patent: Oct. 22, 1985

[54] EMULSIFIERS FOR EMULSION POLYMERIZATION

[75] Inventors: Rainer Hoefer, Duesseldorf; Alfred Meffert, Monheim; Bernd Wegemund, Haan, all of Fed. Rep. of Germany

[73] Assignee: Henkel KGaA, Duesseldorf, Fed. Rep. of Germany

[21] Appl. No.: 615,444

[22] Filed: May 30, 1984

[30] Foreign Application Priority Data

Jun. 1, 1983 [DE] Fed. Rep. of Germany ....... 3319782

[51] Int. Cl.$^4$ ................................................ C08P 2/30
[52] U.S. Cl. .................................... 526/209; 526/204; 526/309; 526/319; 526/328; 526/329.2
[58] Field of Search ......................... 526/209, 210, 204

[56] References Cited

U.S. PATENT DOCUMENTS

| | | | |
|---|---|---|---|
| 2,615,009 | 10/1952 | St. John et al. | 526/209 |
| 3,329,640 | 7/1967 | Scotti et al. | 526/209 |
| 3,406,208 | 10/1968 | Blaser et al. | 260/615 |
| 3,516,975 | 6/1970 | Meincke | 526/209 |
| 3,600,465 | 8/1971 | Knapp et al. | 260/880 |
| 4,153,770 | 5/1979 | Ogata et al. | 526/209 |

*Primary Examiner*—Harry Wong, Jr.
*Attorney, Agent, or Firm*—Ernest G. Szoke; Henry E. Millson, Jr.; Mark A. Greenfield

[57] ABSTRACT

An improved process for the emulsion polymerization of ethylenically unsaturated monomers in an aqueous emulsion, using as the primary emulsifier an ethoxylated $C_{8-25}$ aliphatic vicinal diol.

22 Claims, No Drawings

EMULSIFIERS FOR EMULSION POLYMERIZATION

BACKGROUND OF THE INVENTION

1. Field of the Invention

This invention relates to improving emulsion polymerization by using certain ethoxylated aliphatic vicinal diols as the primary emulsifer.

2. Statement of the Prior Art

Emulsion polymerization is a technique by which an addition polymer or copolymer is produced in at least a two-phase system. Its application requires the emulsification of the monomer in a medium, usually water, through the use of emulsifiers. These are supplied in addition to the other ingredients that go into most polymerizations, such as the initiator and chain transfer agents. The use of this emulsifier is determinative of many of the characteristics of the produced polymer, which is a latex (stable colloidal suspension of polymer particles in a continuous phase, usually water). Moreover, the emulsifier usually cannot be completely removed from the latex. For this reason, and because of the great unpredictability of the efficacy of a given surface-active agent as an emulsifer in polymerization, many compounds that would theoretically be useful are not.

U.S. Pat. No. 3,600,465 (and corresponding German Patent Application No. 12 69 360) disclose various emulsifiers useful for polymerization, including water-soluble salts of $C_{10-20}$ monocarboxylic acids, and theoretically, ethoxylated alkyl phenols and ethoxylated $C_{10-20}$ aliphatic alcohols. No example of ethoxylated compounds are disclosed, nor is the degree of ethoxylation.

U.S. Pat. No. 3,406,208 (and corresponding German Pat. No. 1,190,927) describes ethoxylated $C_{8-26}$ aliphatic vicinal diols (glycols) with up to 40 mols E.O. per mol of diol. To the extent that the compounds disclosed therein fall within the scope of the emulsifiers useful in the improved process of this invention, they are incorporated herein by reference. Possibly because the compounds of this patent have completely different disclosed utility than those of this invention, there is a further disclosure of compounds not useful in this invention's emulsion polymerization, and all of the compounds useful in this invention are not disclosed therein. The compounds of this patent are disclosed as useful detergents for solid surfaces and textiles, particularly for dishwashing, at column 7 lines 3 to 27. There is a mention of the word "emulsifiers" at column 10 line 21, but the disclosure is extremely ambiguous and completely unrelated to polymerization. It should also be noted that U.S. Pat. No. 3,406,208 discloses many compounds which are not useful for the purposes of this invention and which are specifically excluded, for example, ethoxylated alkylphenols such as nonyl phenol, and $C_{8-26}$ aliphatic vicinal diols ethoxylated with 1 to less than 5 E.O German Patent Application No. 28 31 942 describes emulsion polymerization emulsifiers which are ethoxylated alkylphenols, particularly ethoxylated octyl and/or nonyl phenol, for a carboxyl group-containing vinyl chloride emulsion copolymer.

German Patent Application No. 29 00 030, relates to ether alcohol produced from epoxyalkane and alcohol, in the presence of an acid catalyst. More specifically, it describes a process for the ring opening of internal or terminal olefin oxides containing from 6 to 18 carbon atoms with polyfunctional alcohols such as ethylene glycol. These products may then be ethoxylated to produce compounds similar to those of the present invention, although no similar utility is disclosed.

DESCRIPTION OF THE INVENTION

This invention provides an improved process for the emulsion polymerization of various ethylenically unsaturated monomers, wherein the improvement comprises using as the primary emulsifier, an ethoxylated $C_{8-25}$ aliphatic vicinal diol.

1. The monomers to be polymerized by the improved process of this invention include numerous ethylenically unsaturated monomers, essentially all of the monomers normally suitable for emulsion polymerization. Thus, according to the invention, the improved process may be used in the emulsion polymerization of monoolefins. Suitable monoolefins include styrene (vinylbenzene) or other aromatic vinyl compounds such as α-methyl styrene, as well as isobutene. Preferably, the polymers formed have a glass temperature below room temperature. Thus, the improved process is suitable for the production of rubber latices in the broadest sense, for example rubber latices based on butadiene, isoprene, chlorinated butadienes or chlorinated isoprenes and those based on copolymers of diolefins with styrene or acrylonitrile.

In addition, it is preferred to polymerize esters and/or amides of acrylic and/or methacrylic acid. Thus, the emulsifiers may be used in the polymerization of the methyl, ethyl, propyl, isopropyl, butyl, hexyl and/or 2-ethylhexyl esters of acrylic acid and/or methacrylic acid. In addition, the emulsifiers are suitable for use in the emulsion polymerization of n-alkylamides of acrylic acid and/or methacrylic acid.

Vinyl esters are also suitable monomers, and include vinyl acetate, vinyl propionate, vinyl-2-ethyl hexanoate and also higher esters of vinyl alcohol. In another embodiment, vinyl halides may be emulsion polymerized according to the improved process of this invention, particularly vinyl chloride and vinylidene chloride.

The improved process of this invention may also be used in the copolymerization of the foregoing monomers with each other, or of at least one of them with other monomers, optionally those which are partly water soluble. Thus, the improved process is suitable for use in the copolymerization of ethylenically unsaturated monomers with acrylonitrile, methacrylonitrile, maleic or fumaric acid esters, such as di-n-butyl maleate, or with monobutyl maleate. The improved process may be used in the emulsion polymerization of mixtures of different monomers, for example mixtures of acrylates with styrene, and of ethylene with vinyl acetate, if desired in the presence of vinyl chloride, and also vinyl acetate-versatic acid vinyl ester.

According to the invention, the improved process may also be used in the copolymerization of ethylenically unsaturated, substantially water-insoluble monomers with dissociable, water soluble monomers. In that case, the percentage component of the dissociable, water-soluble monomers amounts to less than 60% by weight and preferablly to between 0.5 and 15% by weight, based on the monomer total. Suitable water soluble, dissociable monomers are arcrylic acid, methacrylic acid, itaconic acid, maleic acid, fumaric acid, semiesters of maleic acid, crotonic acid, vinyl phosphonic acid, vinyl sulfonic acid and/or 2-acrylamido-2-methyl propane sulfonic acid (AMPS). In addition to the acids, it is also possible to use their salts, for example with alkali metals or ammonia. Other suitable comonomers are basic esters of acrylic and or methacrylic acid, such as dimethylaminoethyl methacrylate. 2. The emulsifiers to be used are critical to the improved process of this invention. As discussed earlier, some (although not all) of the primary emulsifiers useful in this invention are known per se. However, these compounds have not been disclosed as useful for the particular requirements of emulsion polymerization of ethylenically unsaturated monomers. In one embodiment, useful primary emulsifiers are the reaction products of ethylene oxide with unbranched 1,2-diols containing an even number of about 8 to 24 carbon atoms, preferably about 10 to 18. The primary emulsifiers used in accordance with the invention are obtained by subjecting linear 1,2-epoxy alkanes containing an even number of carbon atoms or mixtures thereof to catalytic ring opening with ethylene glycol, followed by reaction with ethylene oxide. The ring opening of the 1,2-epoxy alkanes is preferably acid-catalyzed. Acid catalysis gives approximately 50% of 1-hydroxy-2-(2-hydroxyethoxy)-alkanes which thus contain 2 primary hydroxyl groups which react in substantially the same way with ethylene oxide. In addition, it is possible to obtain suitable primary emulsifiers by base-catalyzing the ring opening of the 1,2-epoxy alkanes with an excess of ethylene glycol. The products of this reaction are essentially 1-(2-hydroxyethoxy)-2-hydroxy alkanes which contain one primary and one secondary hydroxyl group and which react with ethylene oxide preferentially on the primary hydroxyl group.

In another embodiment the primary emulsifiers of this invention are the reaction products of ethylene oxide with mixtures of aliphatic 1,2-diols consisting of unbranched products with odd and even numbers of carbon atoms, especially $C_{11-18}$. Products such as these may be produced from 1,2-epoxy alkane mixtures of $C_{11-18}$ or $C_{15-18}$ fractions such as those having the following compositions:

$C_{11-14}$-fraction:
  22% by weight of $C_{11}$ 1,2-epoxy alkane,
  30% by weight of $C_{12}$ 1,2-epoxy alkane,
  26% by weight of $C_{13}$ 1,2-epoxy alkane, and
  22% by weight of $C_{14}$ 1,2-epoxy alkane.

$C_{15-18}$-fraction:
  16% by weight of $C_{15}$ 1,2-epoxy alkane,
  32% by weight of $C_{16}$ 1,2-epoxy alkane,
  43% by weight of $C_{17}$ 1,2-epoxy alkane, and
  9% by weight of $C_{18}$ 1,2-epoxy alkane.

These 1,2-epoxy alkanes may be ring-opened in the manner described with an excess of ethylene glycol to form intermediate products which either contain preferably primary hydroxyl groups or primary and secondary hydroxyl groups.

In addition, emulsifiers suitable for use in accordance with the invention may be produced from mixtures of unbranched and 2-alkyl-branched olefin oxides containing a percentage of internal olefin oxides (epoxy alkanes).

The starting materials may be obtained by the Ziegler Process oligomerization of ethylene. They are described, for example, in "Ullmanns Enzyklopadie der technischen Chemie", Vol. 7, page 210, Verlag Chemie (pub.), Weinheim, Germany, 1974. According to German Patent Application No. 29 00 030, discussed above, epoxy alkanes containing an internal epoxide group may also be subjected to ring opening with an excess of ethylene glycol, followed by reaction with ethylene oxide to form primary emulsifiers suitable for use in accordance with the invention. Thus, products having favorable properties are obtained, for example, from a $C_{16-18}$ fraction of any epoxy alkane mixture containing the following constituents according to chain length:

2% by weight of $C_{14}$ epoxy alkanes,
  50% by weight of $C_{16}$ epoxy alkanes,
  38% by weight of $C_{18}$ epoxy alkanes, and
  10% by weight of $C_{20}$ epoxy alkanes.

In order of structure, this mixture has the following composition:

approximately 60% by weight of unbranched, terminal epoxy alkanes,
approximately 25% by weight of 2-alkyl-branched, terminal epoxy alkanes, and
approximately 17% by weight of internal epoxy alkanes.

In producing the primary emulsifiers to be used in the improved process of this invention, the amount of ethoxylation is critical. Thus, from 5 to about 200 mols of ethylene oxide may be reacted with each mol of diol. When referring to 5 mols, that is understood to include the ring-opening product of an epoxy alkane with ethylene glycol reacted with 4 mols of ethylene oxide. The reaction products used in accordance with the invention show increasing hydrophilicity with increasing ethylene oxide content. Thus, reaction products with more than about 50 mols or with more than about 100 mols of ethylene oxide are highly hydrophilic emulsifiers which, as such, show a desirable protective-colloid-like effect, and are therefore useful for some polymerization. For most polymerizations primary emulsifiers which are the reaction products of 1 mol of diol with about 11 to 100, particularly about 16 to 80, mols of ethylene oxide, are preferred. While ethylene oxide is preferred, propylene oxide may also be used under some circumstances.

It may be noted, however, that for certain specific polymerizations, the primary emulsifer may have a mol ratio of 1 mol of diol to 5 to 10 mols, or to 11 to 15 mols, of ethylene oxide, 10 or more mols being generally acceptable.

It may again be noted that any emulsifier compounds disclosed in U.S. Pat. No. 3,406,208 falling within the above emulsifier descriptions are useful for the purposes of this invention, and those portions of U.S. Pat. No. 3,406,208 related thereto are incorporated herein by reference. 3. Other ingredients in the polymerization mass are those normally useful in emulsion polymerization. Thus, the reaction medium is any commonly used, water being preferred.

The above-described primary emulsifiers may be the only emulsifiers used in the polymerization, and may be employed as individual compounds or compositions, or as mixtures thereof. It is also possible, however, to combine the primary emulsifiers with at least one other (secondary) emulsifier and/or with at least one conventional protective colloid. Thus, anionic, nonionic or cationic emulsifiers may be used in conjunction with the primary emulsifiers in accordance with this invention. Suitable anionic emulsifiers are soaps of natural or synthetic fatty acids, disproportionated resin soaps, water-soluble salts of branched monocarboxylic acids (obtainable, for example, by the "Guerbet" reaction), fatty alcohol sulfates, fatty alcohol ether sulfates, alkyl phenol ether sulfates, alkyl benzene sulfonates, parraffin sulfonates, alkyl naphthalene sulfonates, water soluble salts of sulfated oils, sulfosuccinic acid semiesters, sulfosuccinic acid diesters, alkyl ether phosphates, alkyl phenol ether phosphates, alkyl isethionates, condensates of oxy- and aminoalcohol sulfonic acids and/or alkyl diphenyl ether sulfonates. Suitable nonionic emulsifiers are alkyl phenol, fatty acid and/or fatty alcohol ethoxylates. Suitable cationic emulsifiers are fatty amine hydrochlorides and/or quaternary ammonium compounds.

Suitable protective colloids are water soluble cellulose ethers, such as methyl cellulose, carboxymethyl cellulose, hydroxyethyl cellulose or even partly hydrolyzed polyvinyl acetate or partly hydrolyzed copolymers of polyvinyl acetate and vinyl butyl ether.

Those auxiliaries normally used for emulsion polymerization may be used in conjunction with the emulsifiers. Standard auxiliaries such as these are, for example, polymerization initiators and accelerators, for example potassium or ammonium persulfate, hydrogen peroxide, reducing agents, transition metal compounds in quantities of from 0.05 to 2% by weight. Other standard auxiliaries are buffer substances, such as sodium hydrogen carbonate, sodium pyrophosphate, sodium acetate.

It is also possible to use molecular weight regulators such as, for example, 2-mercapto-ethanol, thioglycolic acid, thioglycolic acid esters of ethylene glycol, glycerol or pentaerythritol or even isopropanol.

4. The reaction conditions of the emulsion polymerization are not unusual. Using the disclosed primary emulsifiers the emulsion polymerization reaction may be carried out at temperatures in the range of about 20° to 120° C., preferably about 40° to 100° C. and, more particularly about 50° to 80° C. The reaction may be carried out under normal pressure or, particularly where gaseous monomers are used, under elevated pressure. The monomers may be added by any of the known methods of emulsion polymerization. Thus, an emulsion may be prepared in the reaction vessel and then polymerized. However, monomers, auxiliaries or other emulsions may be added continuously or in batches during the polymerization process.

The proportions of monomers to water should be about 1-3:1 in parts by weight. The primary emulsifiers should be used in a quantity of about 0.1 to 5% by weight, preferably about 1 to 3% by weight, based on the entire weight of the emulsion. The quantities of the other ingredients are not critical, and are those normally used in emulsion polymerization. 5. The uses of polymers produced according to the improved processes of this invention are all of those commonly associated with emulsion polymers and copolymers. For instance, in Example III, infra, polyvinyl acetate made by the improved process of this invention was formulated into an adhesive which showed excellent characteristics. It should particularly be noted that the primary emulsifier did not detract from the quality of the finished products. Thus, adhesive formulations are a preferred end use of the products of this invention's improved processes.

It may also be noted that the products of this invention's improved processes will necessarily be different in physical structure or ingredients (i.e., the primary emulsifier) than the products of other processes. The differences may be small and hard to detect in some instances, but nevertheless are believed to exist. Naturally, it is almost impossible to described such products other than as the result of the inventive processes.

6. The following Examples are illustrative of the improved process of this invention.

EXAMPLE I n-butylacrylate polymer

Formulation:

| | |
|---|---|
| 466.89 g of distilled water | solution 1 |
| 22.96 g of the ring opening product of a mixture of $C_{12}$ 1,2-epoxy alkane (approximately 60% by weight) and $C_{14}$ 1,2-epoxy alkane (approximately 40% by weight) with ethylene glycol reacted with 50 moles of ethylene oxide (OH number 49.8) [PRIMARY EMULSIFIER] | |
| 1.15 g of ammonium peroxodisulfate | |
| 450.0 g of n-butylacrylate | solution 2 |
| 9.0 g of methacrylic acid | |
| 48.85 g of distilled water | solution 3 |
| 1.15 g of sodium disulfite | |
| 1000.0 g of polymer dispersion | |

Apparatus:

A closed, heatable, 2-liter face-ground glass beaker equipped with a V4A-anchor stirrer, a dropping funnel, a reflux condenser and a 2-liter starting vessel equipped with a flat paddle stirrer.

Procedure:

Ammonium peroxodisulfate (1.15 g) and 22.96 g of primary emulsifier are dissolved in 466.89 g of distilled water in the starting vessel (solution 1). 150 ml of this solution are introduced into the reaction vessel. The monomers (solution 2) are added to the remaining solution 1, followed by intensive emulsification for 15 minutes. 150 ml of this pre-emulsion are also introduced into the reaction vessel which is then purged with nitrogen while stirring for 30 minutes. Thereafter, 20 ml of the sodium disulfite solution (3) accommodated in the dropping funnel are run into the reaction vessel and heating is commenced. Polymerization begins between 50° and 60° C. with an increase in temperature. The monomer emulsion from the starting vessel and the rest of solution 3 are then simultaneously introduced over a period of 1 to 1.5 hours, during which the temperature is kept at 65° to 68° C. The reaction mixture is then stirred for 1 hour at approximately 70° C., followed by cooling. The pH of the emulsion is adjusted to between about 6 and 7 with 25% ammonia.

The coagulate content of the dispersion amounts to 0.5%. The speck-free dispersion has a dry residue of 47.0% and a particle size of approximately 0.1 μm.

EXAMPLE II

Butyl acrylate-styrene copolymer

Formulations: (all quantities in grams)

| | a | b | c | d | e |
|---|---|---|---|---|---|
| Solution 1 | | | | | |
| Distilled water | 386.0 | 367.3 | 367.3 | 367.3 | 386.0 |
| Potassium peroxodisulfate | 2.0 | — | — | — | 2.0 |
| Ammonium peroxodisulfate | — | 0.9 | 0.9 | 0.9 | — |
| Anionic (secon- | 17.0 | 15.5 | 15.5 | 15.5 | 17.0 |

-continued

|  | a | b | c | d | e |
|---|---|---|---|---|---|
| dary) emulsifier (nonyl phenol-4-ethylene oxide sulfate, sodium salt, 30% by weight in water) | | | | | |
| Primary emulsifier according to the invention | 10.0 | 9.1 | 9.1 | 9.1 | 10.0 |
| Solution 2 | | | | | |
| Styrene | 240.0 | 223.9 | 223.9 | 223.9 | 240.0 |
| n-butyl acrylate | 240.0 | 223.9 | 223.9 | 223.9 | 240.0 |
| Acrylic acid | 5.0 | — | — | — | 5.0 |
| Methacrylic acid | — | 13.7 | 13.7 | 13.7 | — |
| Solution 3 | | | | | |
| Distilled water | 98.0 | 44.8 | 44.8 | 44.8 | 98.0 |
| Sodium disulfite | 2.0 | — | — | — | 2.0 |
| Ammonium disulfite | — | 0.9 | 0.9 | 0.9 | — |
| Total | 1000 | 900 | 900 | 900 | 1000 |
| Coagulate content | 1% | 0.2% | 0.2% | 0.5% | 2% |

Emulsifiers used in accordance with the invention:

The primary emulsifier used was the ring-opening product of a mixture of $C_{12}$ 1,2-epoxy alkane (approximately 60% by weight) and $C_{14}$ 1,2-epoxy alkane (approximately 40% by weight) with ethylene glycol reacted with:

Example
- (a) 10 mols of ethylene oxide (EO) (OH No. 155)
- (b) 10 mols of ethylene oxide (EO) (OH No. 155)
- (c) 20 mols of ethylene oxide (EO) (OH No. 102)
- (d) 30 mols of ethylene oxide (EO) (OH No. 78)
- (e) Comparison Example: Nonyl phenol + 11 mols of EO.

Apparatus:
See Example I.

Procedure for Examples II(a) and II(e):

The components of solution 1 are mixed and introduced into the reaction vessel which is then purged with nitrogen while stirring for about 30 minutes. Approximately 30 ml of solution 2 accommodated in the starting vessel and 5 ml of solution 3 accommodated in the dropping funnel are then added. The jacket heating is set at 90° C. The polymerization reaction begins at a jacket temperature of 70° C. and at an internal temperature of 55° C. At this moment, the introduction of monomer solution 2 and the sodium disulfite solution 3 is commenced. The internal reactor temperature rises relatively quickly to 88°–98° C. and is kept at that level. The addition of solutions 2 and 3 is over in about 1 hour. Polymerization is then continued for 1 hour at a jacket temperature of 98° C. The polymer dispersion is cooled to approximately 50° C. and adjusted at that temperature to a pH of from 6 to 7 with 5.0 g of 25% ammonia. The polymer disperson is then cooled to room temperature.

Procedures for Examples II(b), II(c) and II(d):

The components of solution I are introduced into the reaction vessel and purged with nitrogen while stirring for about 30 minutes. Approximately 10% of monomer solution 2 are run in from the starting vessel. The reaction mixture is heated by setting the jacket heating at 90° C. The polymerization reactions begins at an internal temperature of 56° C. At that moment, the addition of the rest of monomer solution 2 and of the ammonium peroxodisulfate solution 3 is commenced. The temperature in the reactor rises relatively quickly to approximately 88° C. and is kept at that level. The addition is regulated in such a way that the rest of solution 2 and two thirds of solution 3 have been added 1 hour after the beginning of addition. Towards the end of the addition phase, the temperature in the reactor rises to around 94° C. The after-polymerization phase is initiated by increasing the jacket heating to 98° C. and adding the remaining one third of the ammonium peroxodisulfate solution 3. After 1 hour's after-polymerization, the dispersion is cooled to approximately 50° C. and adjusted to pH 6–7 at that temperature by the addition of 13.7 g of 25% ammonia. The dispersion is then cooled to room temperature.

EXAMPLE III

Polyvinyl acetate, protective colloid-stabilized

Formulations: (all quantities in grams)

|  | a | b |
|---|---|---|
| Distilled water | 424.0 | 424.0 |
| Nonionic emulsifier I [PRIMARY] | 1.6 | 3.2 |
| Nonionic emulsifier II [SECONDARY] | 2.3 | — |
| Polyvinyl alcohol (partially hydrolyzed polyvinyl acetate, degree of hydrolysis 87.7 mol percent, viscosity according to DIN 53 015 26 m Pas as protective colloid) | 21.0 | 21.0 |
| Potassium peroxodisulfate | 0.7 | 0.7 |
| Vinyl acetate | 198.2 | 198.2 |
| Total | 647.1 | 647.1 |

Nonionic emulsifier I: emulsifier of Example IIa [PRIMARY]
Nonionic emulsifier II: 70% aqueous solution of the reaction product of nonyl phenol with 30 mols of ethylene oxide. [SECONDARY]

Apparatus:
See Example I.

Procedure:

Distilled water, nonionic emulsifiers, polyvinyl alcohol and potassium peroxodisulfate are introduced into the reaction vessel, dissolved while stirring and purged with nitrogen. Approximately 15 g of vinyl acetate monomer are then introduced. The reaction mixture is heated by setting the jacket heating at 70° C. The polymerization reaction begins at an internal temperature of 64° C., addition of the remaining monomeric vinyl acetate being commenced at the same time. The addition is over in an hour, the internal temperature of the reactor rising to approximately 73° C. towards the end of the addition. After the jacket heating has been increased to 80° C., the mixture is after-polymerized for 1 hour, resulting in the formation of a white polymer disperson which is processed into a white glue of excellent quality by the addition of 24 g of dibutyl phthalate, 328 g of Calcid and 0.3 g of preservative.

EXAMPLE IV

Vinyl acetate-vinyl ester copolymer

Formulations: (all quantities in grams)

|  | a | b | c | d | e |
|---|---|---|---|---|---|
| Solution 1 | | | | | |
| Distilled water | 191.4 | 191.4 | 191.4 | 191.4 | 191.4 |
| n-dodecyl benzene sulfonate, Na salt | 1.4 | 1.4 | 1.4 | 1.4 | 1.4 |
| Potassium peroxodisulfate | 0.5 | 0.5 | 0.5 | 0.5 | 0.5 |
| Borax | 0.2 | 0.2 | 0.2 | 0.2 | 0.2 |
| Solution 2 | | | | | |

-continued

| | a | b | c | d | e |
|---|---|---|---|---|---|
| Distilled water | 287.3 | 287.3 | 287.3 | 287.3 | 287.3 |
| n-dodecyl benzene sulfate, Na salt | 0.9 | 0.9 | 0.9 | 0.9 | 0.9 |
| Emulsifier according to the invention | 12.0 | 12.0 | 12.0 | 12.0 | 12.0 |
| Potassium peroxodisulfate | 1.9 | 1.9 | 1.9 | 1.9 | 1.9 |
| Borax | 2.1 | 2.1 | 2.1 | 2.1 | 2.1 |
| Solution 3 | | | | | |
| Vinyl acetate | 330.1 | 330.1 | 330.1 | 330.1 | 330.1 |
| Versatic acid - vinyl ester (Veova 10, Shell) | 143.5 | 143.5 | 143.5 | 143.5 | 143.5 |
| Acrylic acid | 4.8 | 4.8 | 4.8 | 4.8 | 4.8 |
| Total: | 976.1 | 976.1 | 976.1 | 976.1 | 976.1 |
| Coagulate content: | 0.05% | 0% | 0% | 0.05% | 0.05% |

Emulsifiers used in accordance with the invention:

The primary emulsifiers used were the ring-opening products of a mixture of $C_{12}$ 1,2-epoxy alkane (approximately 60% by weight) and $C_{14}$ 1,2-epoxy alkane (approximately 40% by weight) with ethylene glycol, reacted with:

Example
(a) 7 mols of ethylene oxide (EO) (OH No. 192)
(b) 10 mols of ethylene oxide (EO) (OH No. 155)
(c) 20 mols of ethylene oxide (EO) (OH No. 102)
(d) 30 mols of ethylene oxide (EO) (OH No. 78)
(e) 50 mols of ethylene oxide (EO) (OH No. 50).

Apparatus:
See Example I.

Procedure:
The components of solution 1 are introduced into the reaction vessel, purged with nitrogen and heated to 80° C. During the heating phase, a pre-emulsion is prepared in the starting vessel by adding monomer solution 3 with vigorous stirring to the emulsifier-containing aqueous phase of solution 2. The pH of the pre-emulsion is adjusted to 3.8–4.0. When the internal temperature of the reactor reaches 80° C., addition of the monomer pre-emulsion is commenced. The addition time is between 2 and 2.5 hours. On completion of the addition, the temperature of the reaction mixture is kept at 80° C. for another 2 hours. The dispersion is cooled and filtered and the pH is adjusted to 7.0–7.5 by the addition of 23.9 g of a 10% ammonium carbonate solution.

The properties of the polymer dispersions prepared in accordance with Example IV are shown below:

| | a | b | c | d | e |
|---|---|---|---|---|---|
| Dry residue (theoretical value 50%) | 49.3% | 49.2% | 49.2% | 49.1% | 49.4% |
| Particle size (visual) | 0.1 μm | 0.1 μm | 0.1 μm | 0.1 μm | 0.1 μm |
| Mechanical stability | 0% | 0% | 0% | 0% | 0% |
| Brookfield viscosity at 20° C. (mPa · s) (Spindle 1) | 170 | 153 | 153 | 132 | 195 |
| Film assessment at room temperature | clear, transparent | | | | |
| at 105° C. | light brown, transparent | | | | |

7. Test methods:

(A) Coagulate content after production

The completed dispersion is poured through a Schwegman tared Perlon sieve bag having a mesh width of 80 microns. The sieve bag and any coagulate present is dried for 24 hours at 105° C. and the coagulate determined by differential weighing.

(B) Dry residue

Dry residue determinations (Satorius, type 709301). The solids content is determined at stage 7 for a drying time of 20 minutes. The quantity weighed in amounts to approximately 5 g. (C) Determination of particle size Particle size is visually determined on the following scales:

| milky-white dispersion | =above 1 micron |
|---|---|
| blueish-white to brownish-white dispersion | =1 micron to 0.1 micron |
| gray-white, semi-transparent dispersion | =0.1 micron to 0.05 micron |
| substantially transparent dispersion | =below 0.05 micron |

(D) Mechanical stability 80 g of the dispersion are stirred for 30 minutes at 14,000 r.p.m. using a Klaxon type HM UB 2 stirrer (Klazon Ltd.) and subsequently filtered through a Schwegman 80 micron sieve bag. The coagulate content is determined by drying and differential weighing of the coagulate, if any, left in the sieve bag (in accordance with ASTM-D 1076).

(E) Viscosity

Viscosity is measured at 20° C. using a Brookfield type RBT viscosimeter.

(F) Film assessment

Two films are drawn using a drawing rule (gap width approximately 1 mm). One film is dried for 48 hours at room temperature and the other for 24 hours at 105° C. In both cases, the films are assessed for color and transparency.

8. The Evaluation of the test results indicates that the polymerizations performed using the improved process of this invention (i.e. using the named primary emulsifiers) are all satisfactory and compare very favorably with results using closely related emulsifiers outside the scope of this invention.

The coagulate content is an important criteria for measuring the quality of an emulsion polymerization product. The coagulate is comprised of destabilized latex and other very undesirable substances which adversely affect the properties of the finished product. Thus, the lower the coagulate content, the better the latex product. Although coagulate may be removed by filtration, it is best to have as little present as possible. For the purposes of this invention, the maximum acceptable coagulate content is about 1.5%, preferably not more than about 1%, most preferably not more than about 0.5%, by weight based on the weight of the total polymerization product.

It should be noted that the coagulate contents of Examples I, II(a)–(d), III(a),(b) and IV(a)–(e), are all acceptable and that these examples are in accordance with this invention. Example IIa is marginally acceptable, and Examples IVa–e are superior in their minimal coagulate content. It may also be noted that whereas the emulsifier nonyl phenol . 30 E.O. (Example III(a)) was acceptable as a *secondary* emulsifier (i.e., where a primary emulsifier according to this invention was also present), the very similar nonyl phenol . 11 E.O. (Example II(e)) was unacceptable as a *primary* emulsifier.

We claim:

1. In a process for the emulsion polymerization of at least one ethylenically unsaturated monomer in an aqueous emulsion with at least one emulsifier, the improvement wherein:

(A) the primary emulsifier is at least one compound which is the product of 1 mol of a $C_{8-25}$ aliphatic vicinal diol ethoxylated with about 5-200 mols of ethylene oxide, and said primary emulsifier is used in a quantity of about 0.1 to 5% by weight, based on the entire weight of said emulsion;

(B) said ethylenically unsaturated monomer is
  (a) predominantly n-butyl acrylate,
  (b) predominantly approximately equal amounts by weight of styrene and n-butyl acrylate,
  (c) predominantly vinyl acetate, or
  (d) predominantly about 2 parts by weight of vinyl acetate and about 1 part by weight of versatic acid-vinyl ester; and (C) the proportion of the total amount of monomers to water is about 1-3:1, in parts by weight.

2. The process of claim 1 wherein said diol is a linear diol, a branched aliphatic 1,2-diol, or a mixture thereof.

3. The process of claim 1 wherein said diol contains only secondary hydroxyl groups.

4. The process of claim 1 wherein said diol is $C_{12-18}$.

5. The process of claim 2 wherein said diol is $C_{12-18}$.

6. The process of claim 3 wherein said diol is $C_{12-18}$.

7. The process of claim 1 wherein said diol is reacted with at least 10 mols of said ethylene oxide.

8. The process of claim 1 wherein said diol is reacted with more than about 50 mols of said ethylene oxide.

9. The process of claim 1 wherein said diol is reacted with more than about 100 mols of said ethylene oxide.

10. The process of claim 1 wherein said diol is reacted with about 11 to 100 mols of said ethylene oxide.

11. The process of claim 1 wherein said diol is reacted with about 16 to 80 mols of said ethylene oxide.

12. The process of claim 1 wherein said diol is reacted with about 5 to 10 mols of said ethylene oxide.

13. The process of claim 1 wherein said diol is reacted with about 11 to 15 mols of said ethylene oxide.

14. The process of claim 1 wherein said diol is at least one unbranched 1,2-diol containing an even number of about 8 to 24 carbon atoms.

15. The process of claim 1 wherein said diol is a mixture of aliphatic, unbranched, 1,2-diols having 11 to 18 carbon atoms.

16. The process of claim 15 wherein said diol is a $C_{11-14}$ mixture.

17. The process of claim 15 wherein said diol is a $C_{15-18}$ mixture.

18. The process of claim 1 wherein said diol is a mixture of unbranched and 2-alkyl branched olefin oxides containing a percentage of internal olefin oxides.

19. The process of claim 18 wherein said diol is a $C_{16-18}$ mixture of epoxy alkanes.

20. The process of claim 1 wherein said emulsion further contains at least one of a secondary emulsifier, a protective colloid, or any mixture thereof.

21. The process of claim 1 wherein said primary emulsifier is used in a quantity of about 1 to 3% by weight, based on the entire weight of the emulsion.

22. The process of claim 1 wherein said diol is ethoxylated with about 7 to 50 mols of ethylene oxide.

* * * * *